Dec. 19, 1967 H. R. CHOPE 3,358,602

METHOD AND APPARATUS FOR DETECTING AND IDENTIFYING REMOTE OBJECTS

Filed June 25, 1964 6 Sheets-Sheet 1

Inventor
Henry R. Chope
by Charles M. Hutchins
His Attorney

Inventor:
Henry R. Chope
by Charles M. Hutchins
His Attorney

Inventor:
Henry R. Chope
by Charles M. Hutchins
His Attorney

Inventor
Henry R. Chope
by Charles M. Hutchins
His Attorney

Inventor:
Henry R. Chope
by Charles M. Hutchins
His Attorney

Inventor:
Henry R. Chope
by Charles M. Hutchins
His Attorney 3,358,602

METHOD AND APPARATUS FOR DETECTING AND IDENTIFYING REMOTE OBJECTS

Henry R. Chope, Columbus, Ohio, assignor to Industrial Nucleonics Corporation, a corporation of Ohio Filed June 25, 1964, Ser. No. 377,860
6 Claims. (Cl. 102—38)

The present invention relates generally to a method and apparatus for detecting and identifying remote objects, for example, the position and nature of enemy equipment and troops. More particularly, it pertains to an improved method and means for tagging, locating, and identifying enemy equipment and apparatus such as may be found in isolated geographical locations.

A defense activity receiving increasing emphasis is that of limited warfare. Such warfare may be fought anywhere on the globe and may often be characteristic of operations fought in jungle or other inaccessible terrain. Location and detection of enemy troops and equipment are difficult. Radar, sonar, and infrared locating and tracking systems all have serious operational limitations when used in jungle or guerrilla warfare. Effective countermeasures have also been developed for use against these types of systems. Further, in many areas of the world, a large percentage of the equipment, such as guns, mortar, and even vehicles, is that which has been appropriated or captured for conversion and use by enemy or guerrilla troops. Under such circumstances, it is even more difficult to distinguish between the equipment of troops on one side and that of troops on the other side.

In accordance with one embodiment of my invention, selected items of military materiel, for example, weapons, ammunition, or vehicles, are provided with one or more nuclear radiation-generating sources embedded or concealed therein. These sources are so designed as to be inactive, and virtually undetectable even by sensitive radiation-monitoring means, until they are "triggered" into action after a predetermined time interval or upon the happening of a predetermined event (such as the firing of a weapon). If such materiel is permitted to fall into the hands of enemy troops, either accidentally or according to plan, it can later be located and identified by nuclear tracking means, even at considerable distances. In accordance with my invention, it is also possible to design the sources so that several different radiation characteristics can be produced and identified at the remote tracking point, thereby distinguishing one type of captured or "planted" equipment from another.

It is therefore broadly an object of my invention to provide an improved method and apparatus for detecting and locating remote objects and positively identifying their source of manufacture or origin.

Another object of my invention is to provide an improved remote object locating and identifying system that is less vulnerable to defensive countermeasures than prior art systems.

Still another object of the present invention is to provide an improved method and apparatus for effectively detecting and identifying certain types of weapons and equipment utilized by enemy or guerrilla forces.

Another object of my invention is to provide an improved method and apparatus whereby weapons or other objects appropriated by the enemy will have imparted to them a "silent" radioactive tag which under some future action or event causes such weapons or objects to become active radiation transmitters of identification and location.

Another object of my invention is to provide a method whereby such tagged objects and enemy apparatus can be detected at a distance.

Still another object of my invention is to provide an improved system whereby enemy or hostile troops can be effectively located so that they may be engaged in combat.

Another object of my invention is to provide a positive identification system that will distinguish between materiel of friendly and enemy forces.

Yet another object of my invention is to provide a nuclear, remote-object detecting and locating system which remains inactive and virtually undetectable until activated upon the happening of a predetermined event or the lapse of a predetermined time.

For additional objects and advantages, and for a better understanding of my invention, attention is now directed to the following detailed description and accompanying drawings. The features of my invention believed to be novel are also particularly pointed out in the appended claims.

*Prior nucleonics ranging systems*

Figure 1:
FIG. 1 is a pictorial sketch showing how the invention may be applied to location of enemy personnel in jungle warfare.

In recent years, a number of military and space applications have been found for nucleonics ranging and tracking systems. Nucleonics systems are systems in which a self-powered source of radiant energy and one or more detectors of said energy are utilized to measure a variable, such as distance, angle, density, or position. For example, such systems have been investigated and developed for tracking a missile during the lift-off phase of its trajectory. In these systems, a radioactive source is attached to the missile and the missile is tracked at two or more ground stations. The angular position and/or distance to the missile is determined. Nuclear tracking systems suitable for such uses are described in the following co-pending patent applications assigned to the same assignee as the present invention: Ser. No. 271,153 filed Apr. 8, 1963, by Henry R. Chope for "Nuclear Indicating System"; Ser. No. 271,154 filed Apr. 8, 1963, by Henry R. Chope, Leonard C. Brown and William R. Clare for "Indicating System"; Ser. No. 271,342 filed Apr. 8, 1963, by Angelo J. Campanella for "Nuclear System"; and Ser. No. 272,182 filed Apr. 8, 1963, by John J. Lentz for "Nuclear Measuring System."

A brief description of one such nucleonics missile tracker is also given in the May 4, 1964, issue of "Missiles and Rockets" magazine. In this system, a high energy gamma source is mounted at one end of a missile. The source emits two energies, one at 1.17 mev. and one at 1.33 mev. Ground-based directional trackers at two or three stations are caused to point toward the source and, hence, toward the missile, thus yielding azimuth and elevation angles.

Nucleonics tracking systems possess certain advantages over radar and other microwave systems in that they can be designed to experience little or no problems with propagation. These systems thus provide an all-weather capability for tracking since they are neither affected by "heat shimmer" common to optical systems nor multipath transmission and ground clutter aberrations common to radar. The gamma particles detected travel in a straight line from the source of the detector; scattered or secondary gamma photons are discriminated against by a collimator at the detector and by electronic discrimination.

Actual tests conducted with airborne, sensitive radiation detectors indicate that identifiable signals and directions can be obtained at slant ranges of approximately 3000 feet for sources emitting energies at 1.33 mev. maximum energy. The detectable range of a nucleonics system at ground level depends upon the energy of the emitting source and its quantity (or amount). The more energetic sources possess higher penetrating power. The greater the quantity of source utilized, the greater the detectable signal at a given range compared to radiation background.

The nucleonics ranging and identification systems discussed above are cooperative systems in that the radiating source of energy is willfully and cooperatively located at a given place so as to provide a signal. Such nucleonics systems provide certain advantages over competing microwave, radiofrequency, or optical systems. Among these advantages are:

(1) The source of energy is self-powered and requires no external source of electrical energy;
(2) A particular radiating source can be positively identified in terms of its energy spectrum;
(3) The source of radiant energy can be made small and extremely lightweight;
(4) The system is silent beyond some maximum range and does not provide a "telltale" signal subject to electromagnetic monitoring at large distances;
(5) In certain source systems, the radiation can be "turned on" or "turned off," depending upon activating conditions; and
(6) The radiating source can be caused to be extinguished, after which time there remains no detectable radiation.

My invention takes advantage of these desirable characteristics in a unique method and apparatus which will first be described in connection with a system for locating and identifying a particular type of weapon in the hands of an enemy.

*Description of a weapon locating and identifying system*

In the system pictorially represented in FIG. 1, a concealed enemy soldier 1 attempts to attack low-flying aircraft 2. The enemy soldier may be well-concealed by trees 3*a*, foliage 3*b*, and other terrain objects 3*c* which cause visual detection of his position to be difficult. However, after firing weapon 4, the metallic rifle barrel 5 is excited by deposited beta emitters and yields a radiation pattern similar to that outlined by the dashed line 6.

It can be seen from FIG. 1 that radar or microwave detection of the enemy equipment or weapons would also be extremely difficult. Objects such as trees 3*a* and foliage 3*b* would yield strong echoes. Since the aircraft is flying at extremely low altitudes (often as low as 100 feet above the ground), radar detectors within the aircraft would receive a large amount of ground clutter. The protecting objects and ground clutter would tend to obscure radar signals obtained from the enemy's equipment. However, when the rifle barrel 5 becomes radioactive, the high energy photons emitted from the barrel penetrate the foliage and provide a radiation pattern whose relative intensity is indicated by the dashed outline 6.

An attack aircraft 7, fitted with directional and ranging radiation detectors, is also shown in FIG. 1. Two detectors provide "up" and "down" signals. These detectors (not shown) may be constructed in accordance with the principles set out in the aforesaid co-pending applications. The difference between these signals provides angle direction in the vertical plane perpendicular to the surface of the earth. Two other detectors similarly provide "left" and "right" signals. The difference between these signals provides azimuth angle information to the location of the radiating target, which, in this case, is the position of the hostile soldier. Relative receiving lobes in the vertical plane are indicated by 8*a* and 8*b* in FIG. 1. When the signals received from both vertical (up-down) detectors 11 are equal, the system axis indicated by dashed line 9 is pointed directly toward the radiating target. Deviations in signal may be read out on a meter within the cockpit of aircraft 7 to provide the pilot of the aircraft with information as to when to drop a destroying missile such as a napalm bomb. Two such destroying missiles are indicated at 10*a* and 10*b* in FIG. 1.

As will be more fully described hereinafter, the readings from the two vertical and two horizontal detectors are also summed and fed to an energy discriminating circuit within the electronic circuits of the directional detector. This circuit then reads out the energy-identifying spectrum of the radiating source. This readout then provides an identification of the original isotope and weapon that is being utilized by enemy soldier 1.

As is well known, the time of dropping bombs or missiles 10*a* and 10*b* to assure the maximum probability of destruction depends upon (1) the speed of the aircraft, (2) the vertical and horizontal angles to the target, (3) its distance from the target, and (4) the altitude of the aircraft. The distance from the target can be determined by a measurement of the intensity of the integrated signals from the four radiation detectors.

Figure 2:
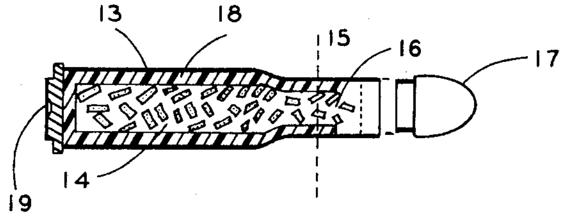
FIG. 2 is a section elevation of a rifle cartridge containing a radioactive "tagging" material in accordance with the invention.

FIG. 2 illustrates a cutaway section of a rifle cartridge suitable for use in the system of FIG. 1. The cartridge 13 is an ordinary cartridge as would be used in a rifle, carbine, or automatic firing weapon, except that some of the individual pellets of smokeless powder 14 contain a beta-emitting isotope. In the cross-section view shown here, individual pellets 14 which are made radioactive are shown to the left of line 15. In order to make difficult the detection of the modified cartridges, pellets 16 shown to the right of line 15 are not radioactive and hence are ordinary pellets of smokeless powder required for the particular caliber of bullet 17 used by the cartridge.

Various methods may be used for imbedding the beta-emitting isotope into the individual smokeless powder pellets. One method causes the beta-emitting isotopes to be added to the smokeless powder pellets during their manufacturing process. A metered amount of beta-emitting isotope is mixed into the smokeless powder slurry prior to the extrusion of the individual pellets. The outer case of the cartridge 13 is of conventional design. However, lining this case is a sleeve 18 of low-Z combustible plastic material. As will be more fully described hereinafter, the combination of self-absorption shielding within the individual pellets and the shielding sleeve 18 absorbs substantially all the beta radiation within the unfired cartridge. This combination shielding-absorber prevents the formation of beta-excited X-rays within the copper cartridge 13 or the bullet 17. Soft X-rays formed within the smokeless powder pellets are substantially absorbed by the plastic sleeve 18, the cartridge 13, the bullet 17, or the firing cap 19.

Figure 3:
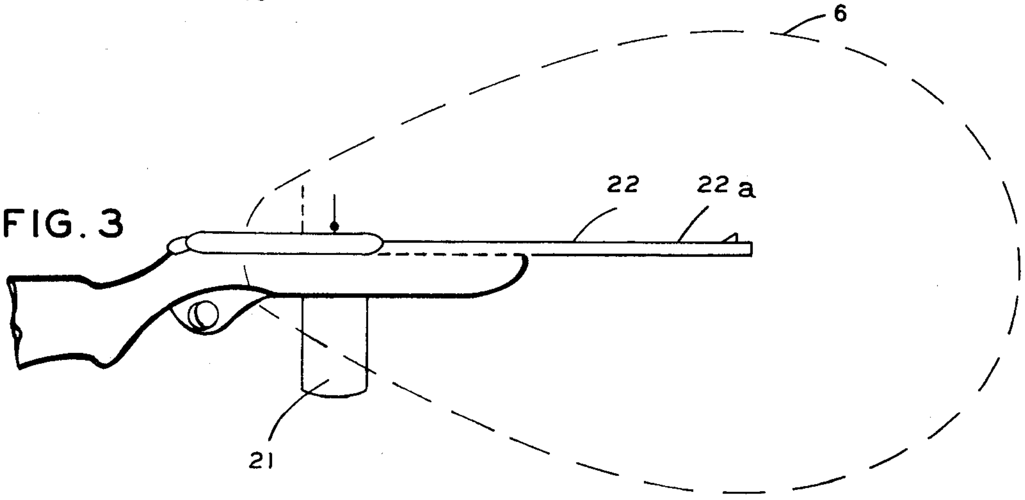
FIG. 3 is a side view of a rifle, illustrating the transmitted radiation pattern resulting from firing the cartridge of FIG. 1.

FIG. 3 is an outline drawing of a rifle or automatic weapon as might be used in combat. Dashed outline 6 again illustrates the radiation field formed with respect to the radiating rifle barrel when the weapon is fired. In the operation of my invention, the cartridge illustrated in FIG. 2 is loaded into magazine 21. When the cartridge is fired, the residual combustion products caused by the burning of the smokeless powder pellets stick to the inner walls of the gun barrel 22. This coating of combustion products is rich in beta-emitting isotopes. The beta rays obtained from the isotopes then activate the gun barrel, causing it to be radioactive and producing a field of X-ray photons.

Figure 4:
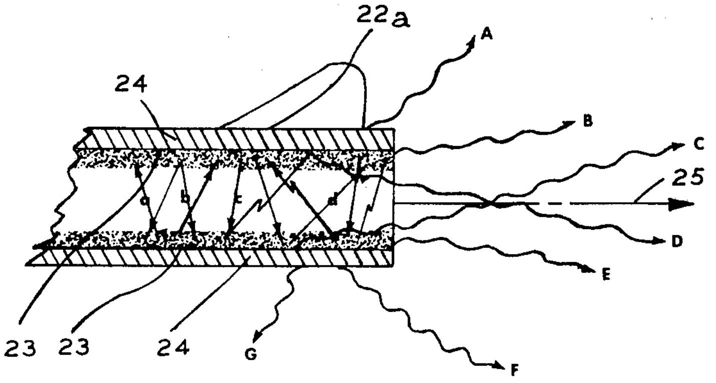
FIG. 4 is an enlarged vertical cross-section through the end of the rifle barrel, illustrating the formation of X radiation.

This action is illustrated in greater detail in FIG. 4 which shows a partial cross section of the end **22*a* of the rifle barrel. Combustion products 23 stick to the inner walls of the gun barrel 22*a*. In some applications of this invention, it may be desirable to have an adhesive compound mixed with the smokeless powder pellets, thereby causing the beta-emitting combustion products 23** to adhere more firmly to the inner wall of the gun barrel. The paths of the beta particles are illustrated schematically by lines *a*, *b*, *c*, and *d* within the gun barrel. As the beta particles traverse the various paths and strike the metallic wall 24 of the rifle barrel 22, the high-speed beta particles are decelerated and a fraction of their energy is converted in known manner to X-ray photons. These photons travel in various directions away from the gun barrel, as indicated in FIG. 4 by wavy lines A, B, C, D, E, F, and G, providing the integrated radiation pattern 6 of FIGS. 1 and 3. The direction of a particular gamma photon may be at any angle with respect to the incident beta ray. However, for beta particle energies greater than 2 mev. (million electron volts), the direction of maximum radiation intensity tends toward the forward direction of the original beta particle. Due, however, to the absorbing effect of the gun barrel wall 24, the maximum radiation pattern would be along the axis of the gun barrel, indicated by the dashed arrow 25 in FIG. 4.

It will thus be seen that, in the system just described, the enemy himself unwittingly broadcasts his location and identifies himself by firing a particular weapon and ammunition. An important advantage of my invention is the fact that these cannot readily be identified, in advance of firing, even by sensitive nuclear detection techniques. Thus, this system is far superior to prior-art radio-beacon systems that have heretofore been proposed for such purposes; for example, small radio transmitters or transponders concealed within gunstocks or other portions of enemy materiel. Any such radiofrequency electromagnetic devices of sufficient radiating power to permit remote tracking are relatively easy to detect by electronic countermeasures equipment commonly accompanying military troops.

In contrast, the beta-excited X-ray sources of my invention remain dormant and nonradiating within the weapon or other piece of materiel until triggered into action. Since in many areas of limited warfare, a large amount of enemy equipment is that which is appropriated through enemy action, the dormant transmitting apparatus or beacon is deliberately implanted within equipment for which there is a high probability it will fall into enemy hands.

A better understanding of the principles underlying this invention can be obtained by now examining in greater detail some mechanisms for obtaining beta-excited X rays.

*Theory of beta-excited X radiation*

In ordinary X-ray tubes, for example, as utilized in medical practice, X radiation is generated by electrical means. Electrically produced X rays are obtained by causing an accelerated electron to strike an X-ray target. In an X-ray tube, electrons are conventionally obtained from a thermionic, heated cathode and are accelerated through an electrical potential applied between the cathode and the target. When a particular electron strikes or impinges upon the target, part of its energy is converted to X radiation. The maximum frequency of the X-ray photon created can be obtained from the following:

$$E_e = h\nu_{max.}$$

where $E_e$ is the energy of the exciting electron, $h$ is Planck's constant, and $\nu_{max.}$ is the maximum frequency of X radiation. Only a small fraction of the energetic electrons have all their energy converted to X radiation. The other electrons lose part of their energy by other mechanisms, such as ionizing collisions within the target before their remaining energy is converted to that of X radiation.

In the practice of the present invention, a beta particle emitting material is used as the source of high-speed electrons. Beta particles are high-speed electrons obtained from beta-emitting substances and hence may also be directed against a suitable target material to generate X rays. Beta-excited X rays possess many advantages over the electrically produced X rays. First, bulky electrical equipment is not required to provide the "beam of electrons" and accelerating voltages. Secondly, beta emitters can be simply shielded. For example, approximately ¼ inch thickness of the plastic material sold commercially under the trademark "Plexiglas," an acrylic resin material manufactured by Rohm & Haas, Philadelphia, Pa., will shield all beta particles from a 2.16 mev. emitter.

Figure 5:
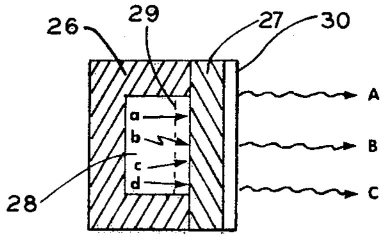
FIG. 5 is a cross-sectional view of the major elements of a beta-excited X-ray source.

FIG. 5 shows the basic parts of a beta-excited X-radiation source. Lining wall 26 is the container or housing for the beta emitter. It is constructed of a material of low atomic number (Z). A cover plate 27, constructed of a material with a high atomic number (Z), forms the X-ray target. The enclosed space 28 contains the beta-emitting substance. The physical state of the beta emitter may be gas, liquid, or solid. Lines *a*, *b*, *c*, and *d* represent schematically some paths of beta particles impinging on target 27. Target 27 may be constructed of different materials and have various shapes. Generally, the higher the atomic number of the target material, (1) the more energetic or penetrating the X radiation and (2) the greater the conversion efficiency of the beta particles to X-rays.

Dashed line 29 in FIG. 5 illustrates that in some cases a partitioning member of low-Z material may be interposed between the beta-emitting material and the target 27 so that initially the target 27 is shielded from the beta particles, thereby preventing the generation of penetrating X radiation. In one embodiment of my invention, described in greater detail at a later point in this specification, the partitioning material 29 is gradually removed through a self-dissolving or corroding action within the material so as to "turn on" the radiation at some specified time.

Also shown in FIG. 5 is an X-radiation filter or screen 30 against the outside face of target plate 27. Its function, as is well known in the art, is to shape the resulting X-ray spectrum by "screening out" soft X rays. It may also be utilized to shape the beam pattern of the X-ray source in known manner.

The resulting X-ray spectrum obtained from a system as shown in FIG. 5, represented schematically by wavy lines A, B, C, is a complicated function of the spectrum of beta energies and the construction of the structure. It depends upon (1) the energy spectrum of the beta exciter in space 28, (2) the atomic number, thickness, and shape of the target material 27, and (3) the atomic number, thickness, and shape of the screen or filter 30. For more detailed descriptions of beta-excited X-ray sources of various types and designs, reference may be made to U.S. Reissue Patent 25,353, granted Mar. 19, 1963, to George B. Foster and Walter H. Canter, Jr., and titled "Radioactive Thickness Gauge"; also to U.S. Patent No. 2,999,935, granted Sept. 12, 1961, to George B. Foster and titled "Convertible Radiation Source." These patents explain in some detail various means and mechanisms for obtaining X-radiation sources of differing characteristics.

The energy of the X radiation produced by electrons through collisions with atoms of a target may be of any value up to the energy of the originating electrons. H. A. Bethe and W. Heitler, in the "Proceedings of the Royal Society," vol. A146, page 83 (1934), have given formulas which, when applied to a continuous spectrum emitter and a thick target, yield an expression for the X-radiation output of an excited target. These formulas are complicated and are found to supply energy spectra which only approximate measured results. A better determination of the performance of an actual X-radiation source system can be obtained from a consideration of graphical energy distribution functions. These may be combined according to certain analytical expressions to yield a resulting energy distribution function for the final X radiation which is in close agreement to that actually measured.

Figure 6:
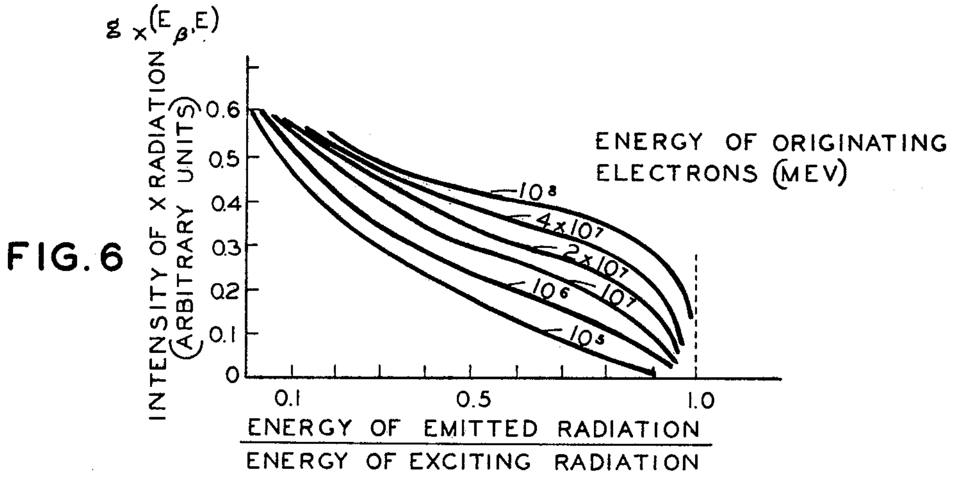
FIG. 6 is a graph illustrating the energy distribution of X radiation for different exciting energies.

FIG. 6 is a graph showing the energy distribution of emitted radiation for various energies of the originating electrons. It can be seen that as the energy of the originating electron increases, there is a greater probability that the X radiation will have an energy which approaches that of the originating electrons. Each of the curves in FIG. 6 can be considered as an energy distribution function $$g_x(E)$$

for the X radiation resulting from electrons of a specified energy. There is a particular distribution function for each energy of exciting beta particles.

Figure 7:
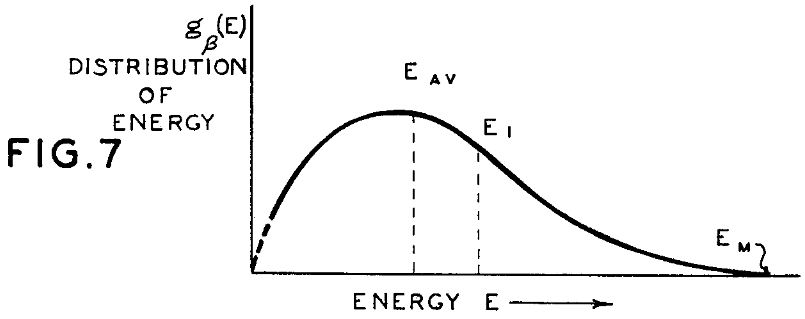
FIG. 7 is a graph showing the energy spectrum of a beta emitter.

FIG. 7 is another graph showing the spectrum of beta particle energies obtained from a particular beta emitter. This spectrum is a continuous spectrum extending from energies near zero through some maximum energy $E_m$. The average energy, $E_{av}$, is often considered to be approximately one-third $E_m$. Any single beta energy, such as $E_1$ in FIG. 7, gives rise to a continuous spectrum of X-ray energies up to a maximum energy of $E_1$.

A resulting X-ray spectrum can be obtained from curves as shown in FIGS. 6 and 7 by a convolution operation of the distribution functions of energy indicated in each curve. The convolution operation is a reasonably straightforward one to grasp and understand and is explained in many books on mathematical analyses. A particularly understandable discussion of convolution is that given in "Notes on Analog-Digital Conversion Techniques" by Alfred K. Susskind, published by The Technology Press, MIT, 1957, pp. 210–222.

The convolution operation provides a composite distribution function by causing one distribution function, such as $g_x(E_\beta, E)$, to be scanned by another, such as $g_\beta(E)$. The composite function $g(E)$ is obtained mathematically as follows:

$$g(E)=\int_0^E g_x(E_\beta, E')g_\beta(E-E')dE' \qquad (1)$$

In this expression, E′ is a variable of integration. With this notation, E is regarded as a summation of increments in E′ between $E'=0$ and $E'=E$, such that $$E=\int_0^E dE' \qquad (2)$$

Symbolically, the convolution of the two functions is often indicated as follows:

$$g(E)=g_x(E_\beta, E)*g_\beta(E) \qquad (3)$$

The symbol * indicates the convolution between the $g_x$ and the $g_\beta$ functions. Note that the $g_x$ function is written as $$g_x(E_\beta, E)$$

In this expression, $E_\beta$ is a parameter for the convolution operation at each beta particle energy.

The convolution method provides a powerful mathematical tool for obtaining complicated resulting functions by a combination of graphical and analytical methods. The mathematical operation of convolution can be performed by a graphical integration, or if a digital computer is available, a numerical integration can be quickly made.

Figure 8:
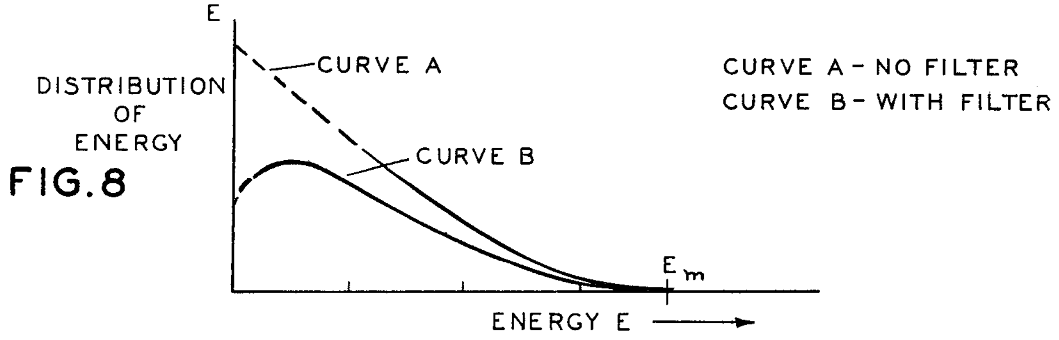
FIG. 8 is a graph showing two energy spectra of beta-excited X-ray sources.

FIG. 8 illustrates the energy curves obtained from beta-excited X-radiation sources. Curve A in FIG. 8 represents a spectrum without filtering out the softer or lower penetrating X-ray photons. Curve B represents the resulting output after filtering by a screen of proper material and shape.

Figure 9:
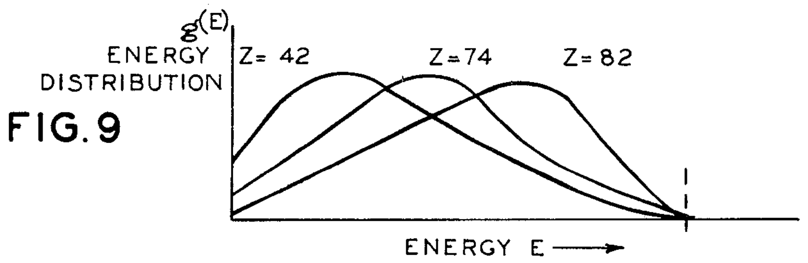
FIG. 9 is a graph showing different X-ray energy spectra plotted against target materials of different atomic numbers.

FIG. 9 illustrates three X-ray spectra normalized to the same maximum amplitude for targets of similar shapes and thicknesses but of different Z numbers. Here it will be seen that the maximum energy peak is shifted to higher energies as the Z of the target is made larger. Thus, it is possible to obtain "spectral signatures" of different excited sources by knowing the material of the target. Likewise, but not shown here, a different mix of exciting beta particles will cause a shift in the maximum energy peak. The higher the energies of the beta exciter, the more the peak of the resulting X-ray spectra is shifted toward higher energies.

Figure 10:
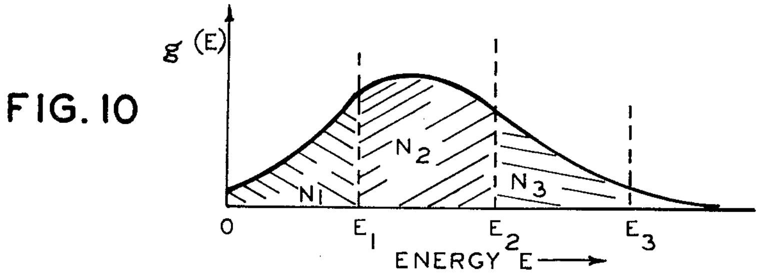
FIG. 10 is a graph showing X-ray energy spectra subdivided into successive energy regions.

FIG. 10 illustrates a particular X-ray spectrum. If the radiation detector counts and resolves individual pulse heights, then the numbers of counts occurring between successive energy levels would be proportional to the areas $N_1$, $N_2$, and $N_3$ found under the different parts of the curve in FIG. 10.

Figure 11:
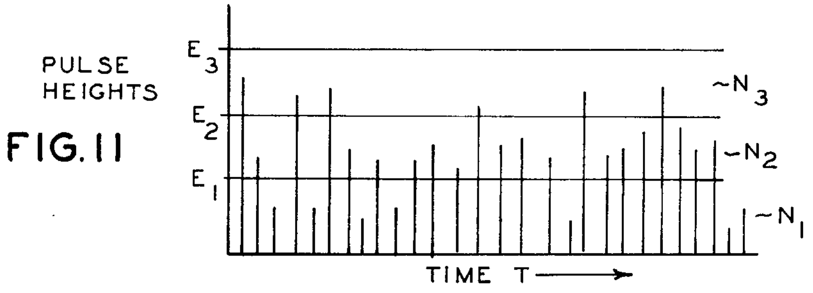
FIG. 11 is a graph illustrating the time distribution of pulse amplitudes obtained from an X-ray detector.

FIG. 11 illustrates the distribution of detected pulse amplitudes in the time domain. The relative number of pulses found in each energy band (or voltage level in the associated electronics) is proportional to the areas $N_1$, $N_2$, and $N_3$ of the curve in FIG. 10. That is, the area $N_1$ represents the relative number of counts found between the energies 0 and $E_1$; the area $N_2$ represents the relative number of counts found between the energies $E_1$ and $E_2$; and the area $N_3$ represents the number of counts found between the energies $E_2$ and $E_3$.

*Specific embodiments of radiating sources*

In the earlier description of a specific locating and identifying system, the excited beta emitter was deposited onto the inner lining of a rifle barrel. Other containments of the exciting energy are useful, especially in cases in which a delayed time reaction is desired before a given piece of equipment is to start "broadcasting." Individual emitters may be concealed in various places of equipment; for example, within a particular mortar shell, under the hood of a vehicle, or somewhere within an integral part of a vehicle's engine.

Figure 12:
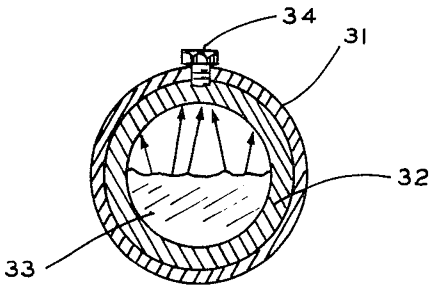
FIG. 12 is a cross-sectional view of one embodiment of an X-ray transmitting device in a "nonbroadcasting" condition.

FIG. 12 shows one form of a delayed action X-ray transmitter. It comprises an outer spherical container 31 of high-Z target material and an inner spherical lining shell 32 of low-Z material. The beta-emitting material is represented as a liquid within spherical volume 33, but it should be remembered that the state of the beta emitter can be either solid, liquid, or gaseous. A particularly desirable form of beta emitter is gaseous krypton-85. Kr–85 is a totally safe emitter. Since Kr–85 is an inert gas, it would not be taken into the body mechanisms even if swallowed.

In the embodiment of FIG. 12, the inner lining shell 32 also contains a delayed acting dissolving agent (not shown). After a period of time, determined by the relative amount of solid low-Z container shield and added solvent, the container is dissolved or eroded away. Escape valve 34 is a valve which allows the beta emitter to escape on some time basis. The escape rate of the beta emitter (for example, a beta emitter in the gaseous state) can be controlled by the valve in such a manner that the X-ray transmitter will become totally inactive and not subject to monitoring beyond some set time.

Figures 13, 14:
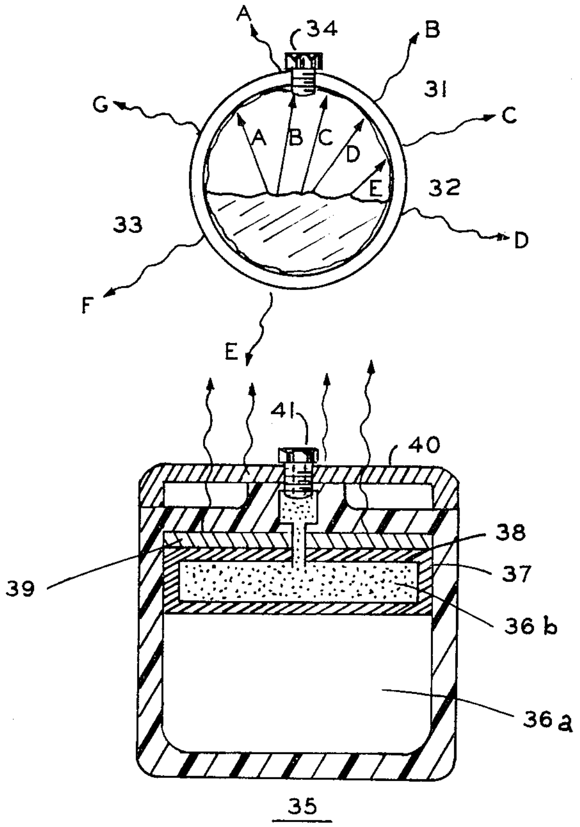
FIG. 13 is a cross-sectional view showing the X-ray transmitter of FIG. 12 in a "broadcasting" condition.
FIG. 14 shows another configuration of an X-ray transmitter.

FIG. 13 shows the condition of the X-ray transmitter of FIG. 12 after the inner liner 32 has been largely dissolved or eroded away. Beta particles, some of whose tracks are shown by the lines *a*, *b*, *c*, *d*, and *e*, now strike the outer target casing 31 and yield X-ray photons represented schematically by rays A, B, C, D, E, F, and G.

By way of illustration, a practical X-ray transmitter of this design can be built to have a total outer diameter of approximately ⅝ inch. Such small transmitters may be planted in numerous places and spots in various equipment subject to appropriation by the enemy.

FIG. 14 shows another embodiment of an X-ray transmitter. In this cross-section view, the emitter is placed within an ordinary component of a vehicle's engine, such as its distributor or oil filter cup 35. Volume 36*a* may contain the usual distributor elements or oil filter cartridge, as the case may be (not shown); while volume 36*b* contains the beta emitter, indicated here as a gaseous substance contained within housing 37. The upper wall 38 of the beta housing is caused on a time basis to dissolve or erode away, for example, by chemical attack in the same manner as the inner liner 32 in the transmitter of FIGS. 12 and 13. When this occurs, a high-Z target 39 becomes the radiating X-ray transmitter.

In FIG. 14, cap 40 represents the top of the distributor or oil filter cup. It could optionally be the target material 39, itself. For example, an iron cap is of suitable atomic number (Z) for use as an X-ray target. In another modification (not shown), a combination cap and target may be used, in which the active target material is laminated between layers of a phenolic material. Such would provide a usable cap for the top of an engine element, such as a distributor.

Element 41 shown in FIG. 14 is intended to represent either a screw securing the cap 40 or a gaseous escape valve, like the valve 34 in FIG. 12 for "turning off" the radiation after some prescribed time; or it may perform both these functions.

Beta-excited X-ray sources of the types I have described may be designed to be entirely stable and to present no hazards to operating personnel working around the equipment in which they are placed. Their basic design parameters are well known to those skilled in the art, since many thousands of beta-excited X-ray sources have been built for industrial uses. In addition to their safety and stability, they provide a great flexibility as regards to the quantity and energy spectrum of radiation available. Their novelty, as applied to the method and apparatus of the present invention, resides in their combination with means, such as I have just described, by which they can be selectively "turned on" or "turned off," after predetermined time intervals or upon the happening of specified events, and utilized to provide the telltale radiation pattern permitting their location and identification by remote radiation-measuring and tracking apparatus.

Another advantage of the sources of the present invention is that the actual targets yielding X radia.ion are active only so long as the exciting beta radiation is present. Hence, a given weapon or vehicle rendered temporarily active becomes totally inert, and undetectable by radiation-monitoring means, when the exciting beta emitter is removed.

Figure 15:
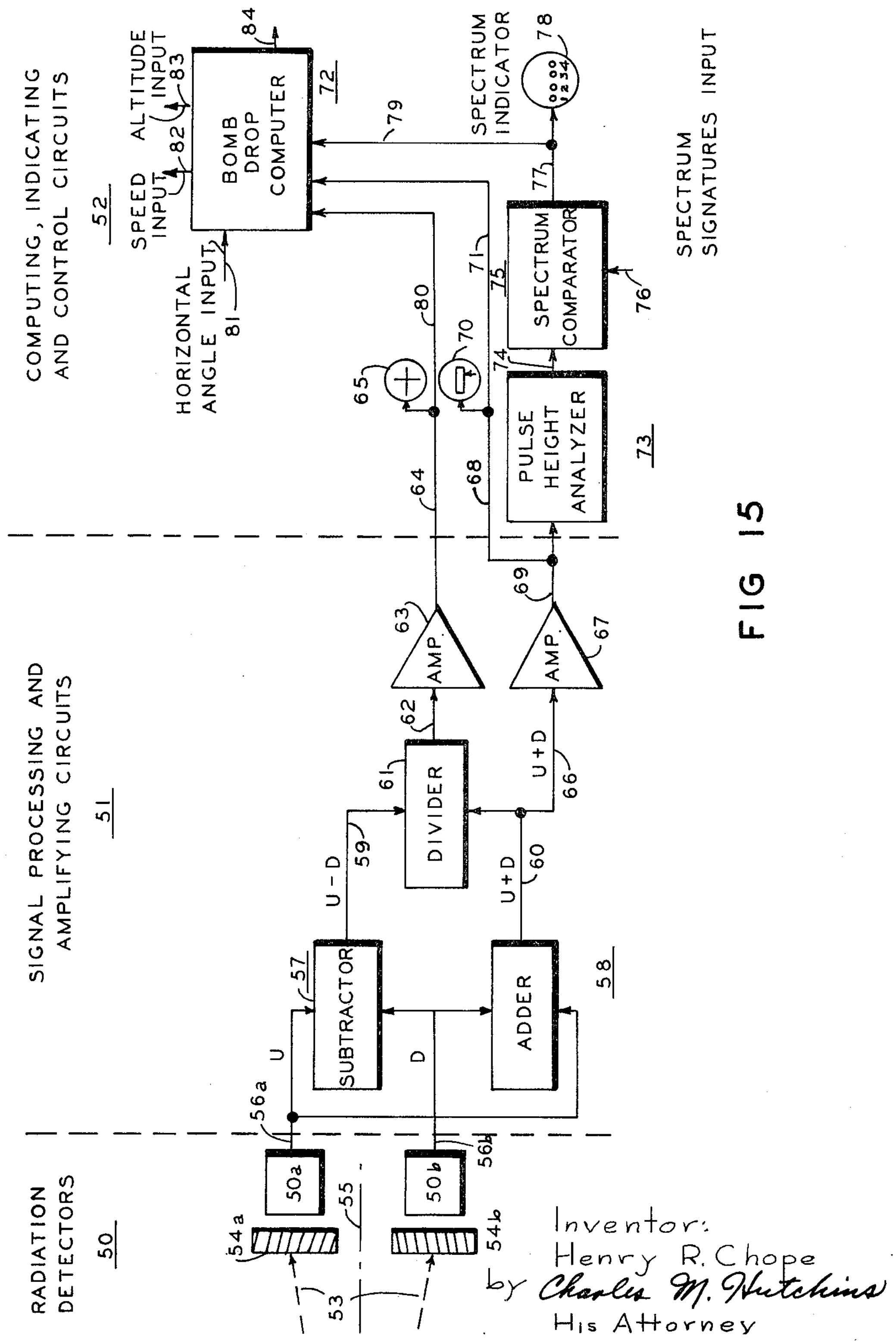
FIG. 15 illustrates the tracking system and its associated electronics for detecting, locating, and identifying unknown sources.

The manner in which the activated radiation sources may be located and identified from a remote point will now be described in greater detail in conjunction with FIG. 15. FIG. 15 is a schematic block diagram of a nuclear detection and tracking system such as might be carried in the attack aircraft 7 of FIG. 1.

*Nuclear tracking and electronics system*

The nuclear tracking and electronics system has the functions of providing output data on: (1) the angular direction to a remote radiating source, (2) a measure of its distance, and (3) a spectral readout and recognition of the particular source's energy distribution characteristics. These functions may be performed with relatively simple radiation detectors and electronic circuits now to be described. FIG. 15 illustrates, in simplified block diagram form, those circuits of the nuclear tracking and electronics system for obtaining such output data in the vertical or elevation plane. Substantially identical circuits may be used to obtain simultaneous data in the horizontal or azimuth plane.

The circuits of FIG. 15 comprise a pair of radiation detectors 50, signal processing and amplifying circuits 51, and computing, indicating, and control circuits 52. The detectors may be one of several well-known types, e.g., scintillation detectors or lithium-silicon detectors. Assuming for the moment the plane of the paper to be vertical, the detectors 50 comprise an upper detector 50*a* and a lower detector 50*b* arranged to receive radiation 53 emanating from a remote source through slit collimators 54*a* and 54*b*, respectively. These detectors and collimators may, for example, be constructed and arranged in a manner shown and described in greater detail in the aforesaid co-pending application Ser. No. 272,-182 of John J. Lentz. As is taught in the Lentz application, each collimator comprises a plurality of parallel plates transverse to the vertical plane of the detectors, much like the slats of a Venetian blind. The parallel plates of the upper collimator 54*a* are tilted upward at a small angle with respect to a coordinate center plane through the axis of symmetry 55 between the two detectors and their collimators; and the parallel plates of the lower collimator 54*b* are tilted downward at the same small angle with respect to this center plane. As is fully explained in the Lentz application, when the remote radiation source is located within the center plane, equal "UP" and "DOWN" signals U and D are generated in the upper and lower detectors and impressed on the upper and lower output lines 56*a* and 56*b*, respectively. When the remote source is located above the center plane, the signal U is greater than the signal D; conversely, when the source is located below the center plane, the signal D is greater than the signal U.

Both detector output signals, U and D, are fed to a subtractor 57 and an adder 58. These may comprise circuits well known to those skilled in the art of computer design, so arranged that the subtractor 57 yields at its output line 59 a difference signal proportional to the value $U-D$, and the adder 58 yields at its output line 60 a sum signal proportional to the value $U+D$. The signals $U-D$ and $U+D$ are fed to a divider 61 which also functions in well-known manner to produce a signal at its output line 62 proportional to the ratio $$\frac{U-D}{U+D}$$

This ratio signal is a measure of the angular deviation of the remote source above or below the coordinate center plane (with respect to the upper and lower detectors). The operation of dividing the difference signal $U-D$ by the sum signal $U+D$ causes the ratio function to be essentially independent of range to the remote source, even though the actual received radiation intensity decreases as the range increases.

The ratio signal is fed to an amplifier 63 over line 62. The output of amplifier 63 then provides voltage information on the vertical angle between the coordinate center plane through axis 55 and a line drawn from the detector assembly 50 to the remote radiation source. This information is fed over line 64 to a cross-hair type of aircraft indicating instrument indicated schematically at 65. The horizontal angle data is likewise fed to the same indicator from the aforementioned azimuth tracking system (not shown).

Sum signal $U+D$ is fed over lines 60 and 66 to a second amplifier 67. The output of amplifier 67 supplies range voltage information to lines 68 and 69. The range information on line 68 is fed to a conventional range indicating instrument 70. This range signal is also supplied over lines 68 and 71 to a bomb drop computer 72 and over line 69 to a pulse height analyzer 73 for purposes shortly to be described.

Pulse height analyzer 73 performs an amplitude discriminating measurement in well-known manner on the individual signal pulses from detectors 50. Their amplitudes or heights are proportional to the energies of the incident X-ray photons at the detectors, and the output of pulse height analyzer 73 contains information on the energy distribution spectrum of the received radiation. Specifically, a readout of information from the pulse height analyzer yields the number of counts found in successive energy regions for the incident radiation. There may thus be presented a simple readout of data summarizing the relative amounts of energies or pulse amplitudes, as previously discussed in connection with FIGS. 10 and 11.

The output from the pulse height analyzer is also fed to a known form of spectrum comparator 75 over line 74. Another input to the spectrum comparator 75, indicated only schematically in FIG. 15 by arrow 76, may supply simple spectrum signatures of known source characteristics.

The spectrum comparator 75 compares the energy spectrum from the pulse height analyzer 73 with a known spectrum from input 76 and transmits information over line 77 to a spectrum indicator 78. Indicator 78 may read out the identifying information on one of a plurality of neon lights, for example, to indicate visually which one of several energy spectra is most nearly matched by that of the sum signal $U+D$ from radiation detectors 50. Since the spectrum of energy from captured energy equipment can be predetermined, indicator 78 is analogous to an I.F.F. (identification-of-friend-or-foe) indicator such as is well known in radar tracking systems.

The spectrum identification information from comparator 75 is also supplied over lines 77 and 79 to bomb drop computer 72. Its function with respect to bomb drop computer 72 is to provide a "last instant" override signal as to whether or not a destroying bomb should be dropped by aircraft 7 (FIG. 1).

Bomb drop computer 72 receives elevation angle data over lines 64 and 80 and azimuth angle data from the other radiation tracking system (not shown) as indicated schematically by arrow 81. Also fed into the bomb drop computer 72 from other data sources (not shown) are the aircraft speed (arrow 82) and the aircraft altitude (arrow 83). The summation of information on aircraft speed and altitude, plus the measured information of distance and angular direction to the target, is used in well-known manner to provide an automatic bomb release command signal, indicated schematically by arrow 84, which is supplied to bomb-dropping mechanism in the aircraft. To increase the simplicity of the system and to reduce the total aircraft load, the functions of the bomb drop computer may, of course, be performed manually by the aircraft pilot.

In any event, details of the aircraft fire-control and indicator systems form no part of my present invention and have been illustrated schematically only for completeness of illustration. The tracking system shown in FIG. 15 is relatively simple as regards to number and complexity of components utilized. By using solid-state components and miniaturization techniques well known to the art, the aircraft tracking and control equipment may be made very lightweight, small, and reliable in operation. Although the invention has been particularly illustrated as applied to airborne detection, location, and identification of captured or "planted" equipment, it will be obvious that the invention may also be applied to land or sea operations. For example, two-dimensional tracking systems may be located in moving vehicles or on ships for use in surveillance or fire-control operations.

It will also be obvious to those skilled in the art that a series of beta-excited X-ray transmitters may be "planted" in or on the same or different pieces of military equipment. The spectral characteristics of the several X-ray transmitters may be made different by using different beta exciters for each source or by using target or shielding materials of different atomic numbers. By distinguishing between the different energy spectra received at the tracking equipment, the positions and time sequences of movement of different equipments can be determined. A further means of identifying different transmitters is to design them so that the protective low-Z shielding materials are removed or disintegrated after different time intervals.

The type of beta-excited X-ray transmitter exemplified by the rifle and cartridge of FIGS. 2–4 may also be applied to other devices and weapons where the initially dormant, beta-emitting material is brought into close physical proximity to the high-Z target material by explosive or mechanical means. The invention is equally applicable to heavier mortar or artillery weapons and to various forms of shells and munitions cartridges. The principal requirements are that the bore of the weapon be lined with high-Z material and that the radioactive charge be shielded by a low-Z material prior to firing.

While the invention has been illustrated with particular reference to nuclear detection and identification of captured enemy equipment, it may also be used in ordinary commerce as an aid in locating thefts or other misappropriations of valuable personal properties. For example, pretimed radiation capsules, as illustrated in FIGS. 12 and 13, may be concealed in briefcases, luggage or shipping containers for money, securities, art-works, jewelry, or other valuables, or concealed within the valuable property itself, so as to give a silent warning, after a predetermined time, to inspectors or other officials equipped with radiation monitors.

Thus, while certain specific embodiments of my invention have been shown and described, it will be understood that various other modifications may be made without departing from the principles of the invention. The appended claims are therefore intended to cover any such modifications within the true spirit and scope of the invention.

I claim:

1. A cartridge for firing in a gun to permit the location of the gun firing the cartridge, said cartridge comprising:
   - a cartridge case and bullet,
   - said cartridge case having an explosive firing charge,
   - the improvement comprising a radioactive material mixed in with said charge that leaves residual radioactive material in the gun after said cartridge is fired to produce radiation detectable at a remote location.

2. A cartridge as in claim 1, wherein said radioactive material is a beta-emitting isotope, said gun has a barrel of high Z material, and said detected radiation is beta-excited X-rays produced by said barrel acting as the target.

3. The cartridge, as described in claim 1, wherein the cartridge case comprises a shielding sleeve substantially between the radioactive material and said case to absorb substantially the radiation from said radioactive material.

4. The cartridge, as described in claim 1, wherein said radioactive material is a beta-emitting isotope, said gun has a barrel of high Z material, said detected radiation is beta-excited X-rays, produced by said barrel acting as the target, and said cartridge case comprises a shield sleeve substantially between said isotope and said case to absorb substantially the beta radiation from said isotope.

5. The combination, with a munitions cartridge or the like of the type having a cylindrical casing containing an explosive charge, a projectile seated in one end of the casing and detonating means seated in the other end of the casing, of a cylindrical liner composed of a material having a low atomic number interposed between said casing and said charge, and a beta-emitting radioisotope dispersed throughout a major portion of said explosive charge.

6. The combination of claim 5 in which said explosive charge comprises smokeless powder pellets with said radioisotope embedded therein.

References Cited

UNITED STATES PATENTS

| | | | |
|---|---|---|---|
| 2,770,736 | 11/1956 | Krasnow | 250—106 |
| 2,797,333 | 6/1957 | Reiffel | 250—84 |
| 2,987,621 | 6/1961 | Mielziner et al. | 250—106 |

ARCHIE R. BORCHELT, *Primary Examiner.*

RALPH G. NILSON, *Examiner.*

S. ELBAUM, *Assistant Examiner.*